(12) United States Patent
Otvagin et al.

(10) Patent No.: US 9,781,144 B1
(45) Date of Patent: Oct. 3, 2017

(54) DETERMINING DUPLICATE OBJECTS FOR MALWARE ANALYSIS USING ENVIRONMENTAL/CONTEXT INFORMATION

(71) Applicant: FireEye, Inc., Milpitas, CA (US)

(72) Inventors: Alexander Otvagin, Campbell, CA (US); Vineet Kumar, San Jose, CA (US); Arsen Movsesyan, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 31 days.

(21) Appl. No.: 14/502,866

(22) Filed: Sep. 30, 2014

(51) Int. Cl.
*G06F 21/55* (2013.01)
*H04L 29/06* (2006.01)

(52) U.S. Cl.
CPC ...... *H04L 63/1425* (2013.01); *H04L 63/1433* (2013.01)

(58) Field of Classification Search
CPC ..... H04L 63/14; H04L 63/1441; G06F 21/56; G06F 21/566; G06F 21/50
See application file for complete search history.

(56) References Cited

U.S. PATENT DOCUMENTS

2011/0219450 A1* 9/2011 McDougal ............. G06F 21/56 726/23
2013/0117848 A1* 5/2013 Golshan .................. G06F 21/53 726/23

* cited by examiner

*Primary Examiner* — Izunna Okeke
(74) *Attorney, Agent, or Firm* — Cesari and McKenna, LLP (57) ABSTRACT

A malware detection system may be configured to enhance analysis of an object when determining whether results for a previously analyzed object may be applied to the object. The enhanced analysis may employ context factors pertaining to an environment within which the objects operate. If an object identifier (ID) of the object matches the object ID of the previously analyzed object, but one or more of the context factors differ, then the results from the previously analyzed object may not be applied to the object and the object is subjected to further analysis, e.g., behavioral analysis. Yet if the context factors do not differ, then the object may be deemed a duplicate of the previously analyzed object, such that a result (such as an alert or "no action") of the previously analyzed object may be applied to the object.

34 Claims, 6 Drawing Sheets

DETERMINING DUPLICATE OBJECTS FOR MALWARE ANALYSIS USING ENVIRONMENTAL/CONTEXT INFORMATION

BACKGROUND

Technical Field

The disclosure relates to malware detection systems and, more specifically, to determining duplicate objects analyzed by a malware detection system.

Background Information

A prior approach to analyzing potential malicious software (malware) involves use of a malware detection system configured to examine content of an object, such as a web page, email, file or universal resource locator, and rendering of a malware/non-malware classification based on previous analysis of that object. The malware detection system may include one or more stages of analysis, e.g., static analysis and/or behavioral analysis, of the object. The static analysis stage may be configured to detect anomalous characteristics of the object to identify whether the object is "suspect" and deserving of further analysis or whether the first object is non-suspect (i.e., benign) and not requiring further analysis. The behavioral analysis stage may be configured to process (i.e., analyze) the suspect object to arrive at the malware/non-malware classification based on observed anomalous behaviors.

The observed behaviors (i.e., analysis results) for the suspect object may be recorded (cached) in, e.g., an object cache that may be indexed by an object identifier (ID) that is generated for the object. During subsequent analysis of a second object, the object cache may be searched using the object ID of the second object and, if there is a match, the second object may be deemed a "duplicate" of the suspect object and further analysis may not be required. Rather, the recorded analysis results for the suspect object may be used to either issue an alert if the object is deemed malware or to take no action if the object is classified as benign.

However, the malware landscape has changed whereby malware is now designed to evade detection and, thus, has become a pervasive problem for computers or nodes coupled to networks, e.g., on the Internet. Malware (or an exploit) is often embedded within downloadable content intended to adversely influence or attack normal operations of a node. For example, malware content may be embedded within one or more objects associated with file storage, email or web pages hosted by malicious web sites. Notably, malware may circumvent the prior analysis approach through the use of a package including two or more objects, e.g., a primary file and a secondary file, attached to an email or contained in file storage and/or downloadable content, where each of the objects may appear individually as benign. The package may be "tuned" to transform a previously deemed benign object (as determined by a previous analysis of the primary file) into malware through, e.g., activation of the malware contained in the secondary file of the package. The prior approach may not detect such maliciousness of the package because a comparison of object IDs between the primary file and cached entries of the object cache may indicate that the primary file (and, thus, the package) is non-suspect and no further action is taken.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments herein provide a malware detection system configured to enhance analysis of an object when determining whether results for a previously analyzed object may be applied to the object. The enhanced analysis may employ context factors pertaining to an environment (e.g., operating system, application, and package) within which the object operates. If an object identifier (ID) of the object matches the object ID of the previously analyzed object, but one or more of the context factors differ, then the results from the previously analyzed object may not be applied to the object and the object is subjected to further analysis, e.g., behavioral analysis, considering the differing context factors. Yet if the context factors do not differ, then the object may be deemed a duplicate of the previously analyzed object, such that a result (e.g., an alert or "no action") of the previously analyzed object may be applied to the object.

In an embodiment, the context factors may include one or more of the following categories, among others: (a) analysis applied, such as a software profile (e.g., operating system, application, and/or respective versions) of a virtual machine (VM) used to emulate behavior of submitted content (e.g., a single object or family of objects colluding to render a malicious package), (b) object characteristics, such as a file type (e.g., executable, PDF, ZIP, text file) containing or constituting the object, and (c) time related, such as a time proximity between arrival of the objects (within or outside a selected time window). For example, if the software profile of the VM used to process the previously analyzed object is the same profile used to process the object (e.g., based on availability of software for provisioning the VM), the results from the previously analyzed object may be applied to the object. Otherwise, further behavioral analysis may be performed on the object, e.g., using the different software profile, as behaviors may differ with different software configurations. The context factors may be factory set, configurable by a management console (i.e., automatically configurable), or selected by an administrator, e.g., from a user interface menu, and may be of a static or behavioral nature, depending on the embodiment.

In an embodiment, the enhanced analysis may further employ a correlation engine configured to determine a weighted degree of "similarity" of the objects based on, e.g., experiential knowledge. The correlation engine may be deployed in connection with a behavioral analysis stage of the malware detection system to enable further behavioral testing of the object, if appropriate. For example, when the determined weighted degree of similarity exceeds a predefined threshold (typically corresponding to high correlation), the system may automatically pursue further behavioral testing of the object. The threshold may be factory set, automatically configurable, or administrator set.

In an embodiment, the context factors may be considered when the malware detection system renders a decision on (i) whether to submit the object for behavioral analysis, (ii) assigning a priority to the object for scheduling behavioral analysis, and/or (iii) continuing or terminating behavioral analysis of the object. Based on (1) object ID matching, (2) comparison of context factors, (3) similarity (i.e., correlation) to the previously analyzed object, and/or (4) combinations thereof, the malware detection system may decide whether the object is suspect and should be submitted for behavioral analysis. If so, scheduling of behavioral analysis by, e.g., a scheduler of the system may consider a length of a queue of suspect objects awaiting behavioral analysis, traffic conditions, and possible "threat level" posed by the object. Based on these considerations, the scheduler may drop certain suspect objects from further analysis. Alternatively, or in addition, the system may use the object ID and context factors to prioritize the object for behavioral analysis. For example, if the correlation with a previously analyzed object (determined to be malicious) is substantially high (though not a match), the object may receive a high priority for behavioral analysis. Finally, if the context factors employed during testing of behavioral analysis of the object indicate a high correlation with the previously analyzed object, then a duration of that analysis may be extended (e.g., longer VM processing is indicated) or shortened (e.g., the previously analyzed object was declared malware or benign).

DESCRIPTION

Figure 1:
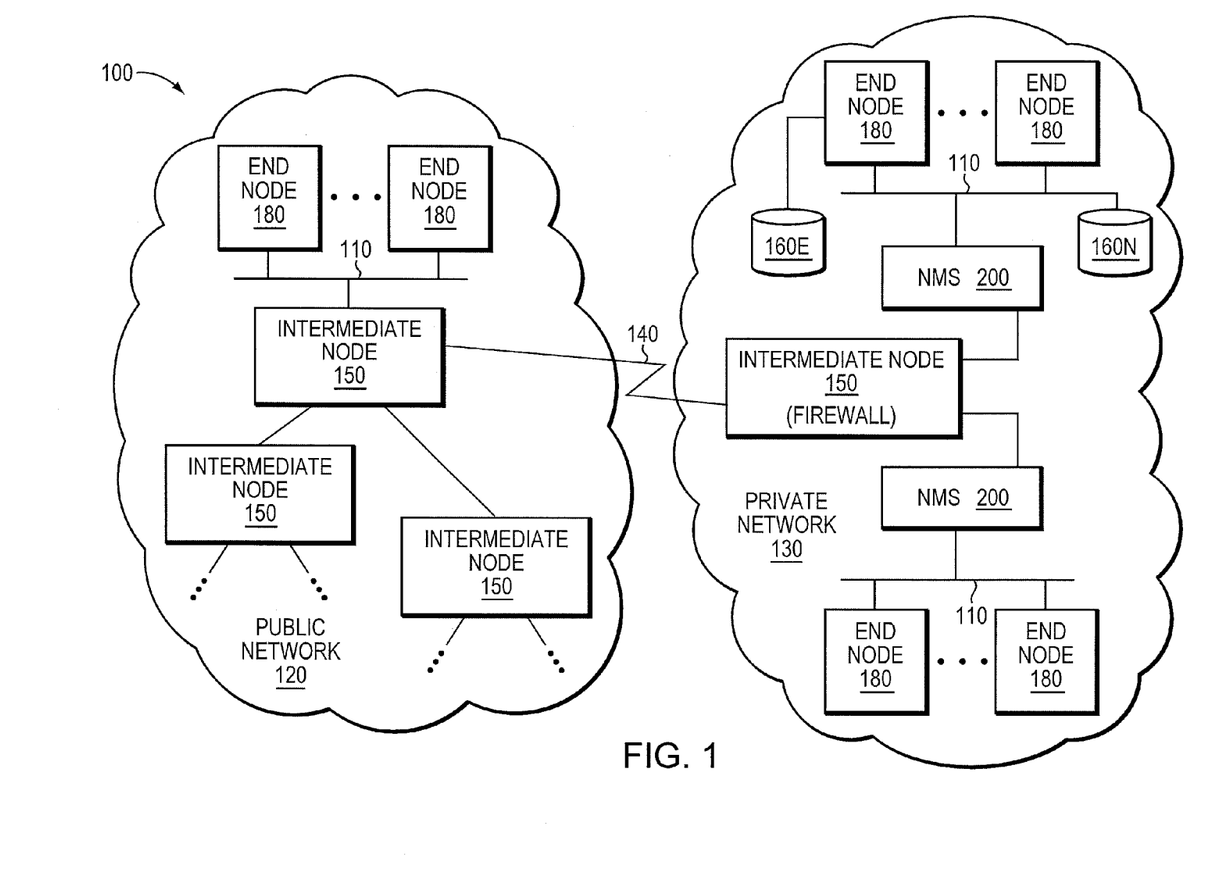
FIG. 1 is a block diagram of a network environment that may be advantageously used with one or more embodiments described herein.

FIG. 1 is a block diagram of a network environment 100 that may be advantageously used with one or more embodiments described herein. The network environment 100 illustratively includes a plurality of computer networks organized as a public network 120, such as the Internet, and a private network 130 (i.e., customer network), such as an organization, enterprise, or personal network. The networks 120, 130 illustratively include a plurality of network links and segments connected to a plurality of nodes. The network links and segments may include local area networks (LANs) 110 and wide area networks (WANs) 140, including wireless networks, interconnected by intermediate nodes 150 to form an internetwork of nodes, wherein the intermediate nodes 150 may include network switches, routers and/or network malware detection systems (NMSs 200) described further herein. Each NMS 200 may cooperate with one or more other malware detection appliances (including another NMS) having one or more processing elements to provide cloud solutions embodied as, e.g., Software as a Service (SaaS), for an enterprise. The LANs 110 may, in turn, interconnect end nodes 180 which, in the case of private network 130, may be illustratively embodied as endpoints. The LANs may also include network storage 160N, while the end nodes embodied as endpoints may include endpoint storage 160E (e.g., disk drives, flash drives, removable media), which together constitute customer storage.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent electronic device having network connectivity that may be configured to implement a virtualization system. The nodes illustratively communicate by exchanging packets or messages (i.e., network traffic) according to a predefined set of protocols, such as the Transmission Control Protocol/Internet Protocol (TCP/IP); however, it should be noted that other protocols, such as the HyperText Transfer Protocol (HTTP), may be advantageously used with the embodiments herein. In the case of private network 130, the intermediate node 150 may include a firewall or other network device configured to limit or block certain network traffic to protect the endpoints from unauthorized users.

Figure 2:
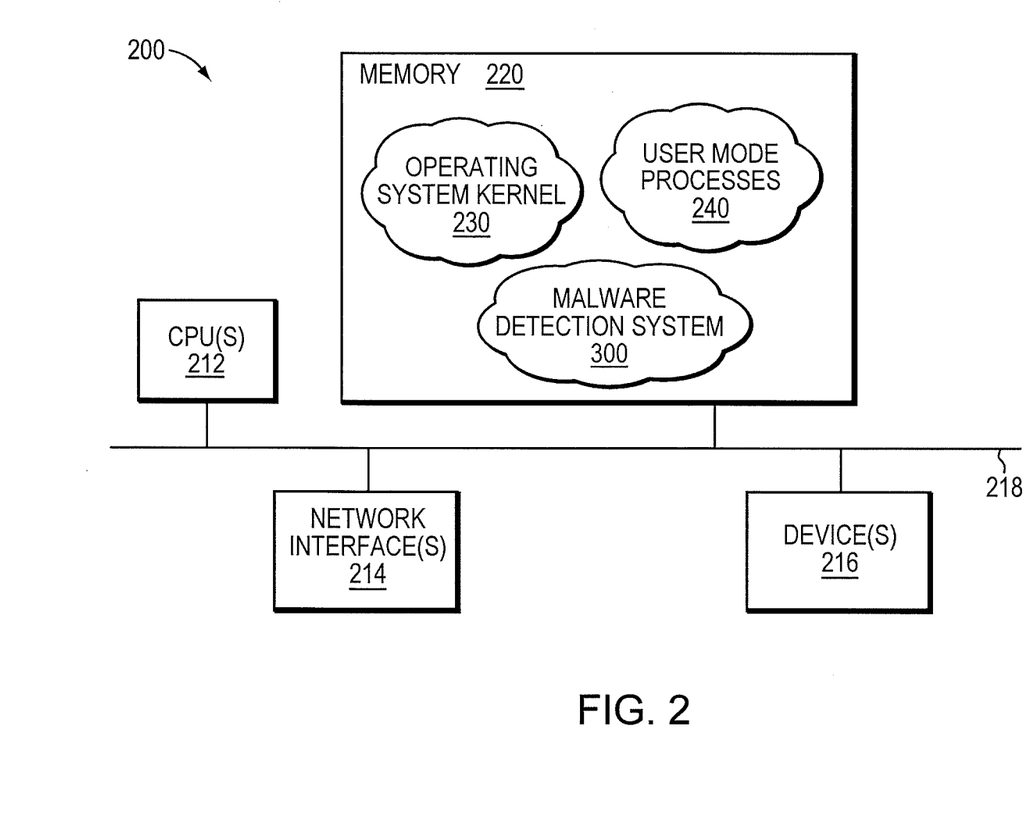
FIG. 2 is a block diagram of an intermediate node that may be advantageously used with one or more embodiments described herein.

FIG. 2 is a block diagram of an intermediate node that may be advantageously used with one or more embodiments described herein. The intermediate node is illustratively embodied as NMS 200 and includes one or more central processing units (CPUs) 212, a memory 220, one or more network interfaces 214 and one or more devices 216 connected by a system interconnect 218, such as a bus. The devices 216 may include storage devices (e.g., disks, including hard disk drives and solid state drives), and/or other types of input/output (I/O) or peripheral devices. Each network interface 214 may include one or more network ports containing the mechanical, electrical and signaling circuitry needed to connect the node to the network 130 to thereby facilitate communication over the network. To that end, the network interface 214 may be configured to transmit and/or receive messages using a variety of communication protocols including, inter alia, TCP/IP and HTTP.

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as malware detection system 300, and manipulate the data structures. Exemplary CPUs may include families of instruction set architectures based on the x86 CPU from Intel Corporation of Santa Clara, Calif. and the x64 CPU from Advanced Micro Devices of Sunnyvale, Calif.

An operating system kernel 230, portions of which are typically resident in memory 220 and executed by the CPU, functionally organizes the node by, inter alia, invoking operations in support of the application programs executing on the node. A suitable operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the application programs may be implemented as user mode processes 240 of the kernel 230. As used herein, a process (e.g., a user mode process) is an instance of software program code (e.g., an application program) executing in the operating system that may be separated (decomposed) into a plurality of threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code and computer, e.g., application, programs stored in memory, alternative embodiments also include the code/programs being embodied as modules consisting of hardware, software, firmware, or combinations thereof.

The malware detection system 300 may be configured to enhance analysis of an object, i.e., a current object, when determining whether results for a previously analyzed object may be applied to the current object to resolve whether the objects are duplicates. As noted, a prior analysis approach examined content of the current object, e.g., a file, based on a previous analysis of the file. An object identifier (ID) may be calculated based on the content of the object (e.g., file) and the results of the previous analysis of the object may be cached as entry of an object cache using the object ID. If that object reappears, e.g., as the current object, and its object ID matches the object ID of the cached entry, the cached results of the previous analysis may be applied and those results may be used to possibly obviate further analysis of the current object.

Figure 3:
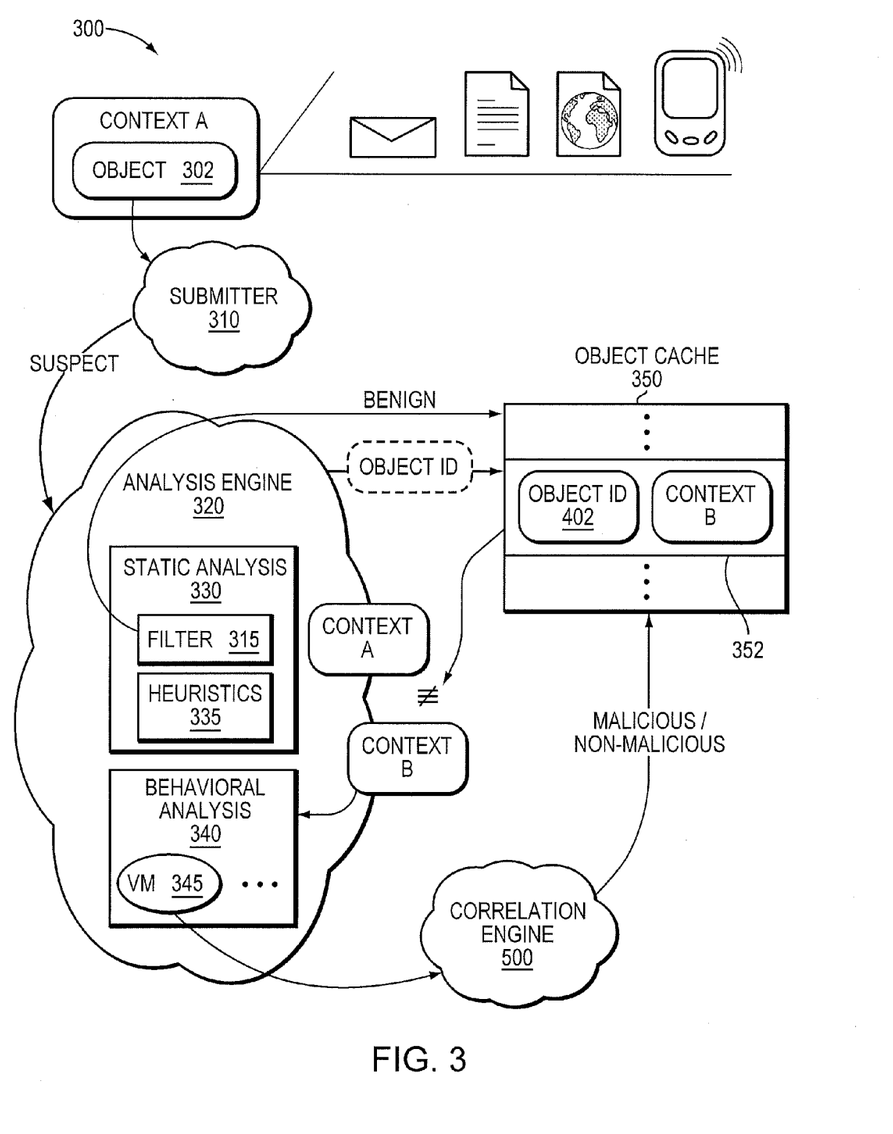
FIG. 3 is a block diagram of a malware detection system configured to enhance analysis of an object that may be advantageously used with one or more embodiments described herein.

FIG. 3 is a block diagram of a malware detection system configured to enhance analysis of an object when determining whether results for a previously analyzed object may be applied to the object. The malware detection system 300 may include a submitter 310, an analysis engine 320 and a correlation engine 500. In an embodiment, the submitter 310 may be embodied as a module containing computer executable instructions executed by the CPU 212 to examine each object (e.g., file, URL and email) provided to the system for analysis from customer storage (e.g., network storage 160N and/or endpoint storage 160E), HTTP payload/emails directed to an endpoint via the LAN 110 and/or other sources. In response to such examination, the submitter may decide whether it is appropriate to submit the object to the analysis engine 320. If a decision is made to submit, the submitter 310 may also provide one or more context factors for use by the analysis engine 320. Illustratively, there is a submitter (and a NMS 200) for each type of "attack vector," i.e., mode of object ingress to the customer network (e.g., email, web, file storage, mobile); however some implementations may employ one type of submitter, while other implementations may employ a different type of submitter. For example, the submitter may be configured to operate on each type of attack vector and extract the object for submission to the analysis engine. For the email attack vector, the submitter may extract a payload of the email (which may be an object, such as a file or URL) and send the object to the analysis engine 320. For a web attack vector, the submitter 310 may examine one or more packets (e.g., HTTP packets) and may extract a payload (which may be an object, such as a file or URL) and may send the object to the analysis engine 320. Note that in some implementations, the submitter may submit the entire packet to the analysis engine.

In an embodiment, the analysis engine 320 may contain computer executable instructions executed by the CPU to render a decision as to whether the current object 302 is a duplicate of a previously analyzed object and the extent of analysis to be performed if the object is not a duplicate. To that end, the analysis engine 320 may be embodied as a static analysis stage 330 and a behavioral analysis stage 340, the latter of which may be enhanced with context factoring, as described herein. The current object 302 may be contained in any attack vector (e.g., file storage, an email or network content). The static analysis stage 330 may illustratively employ a heuristics engine 335 configured to detect anomalous characteristics of the current object to identify whether the current object is "suspect" and deserving of further analysis or whether it is non-suspect (i.e., benign) and not in need of further analysis.

The static analysis stage may also employ a filter 315 configured to identify whether the current object, e.g., a Portable Document Format (PDF) file, is non-malicious, i.e., benign. That is, the filter may separate (screen) objects determined to be benign (e.g., deemed non-malicious). To that end, the filter 315 may screen objects having no (i.e., absence of) executable code, e.g., check whether there is a script within the PDF file which could be malicious. If there is no such executable code (e.g., script), the static analysis may render a decision that the object is not malicious. Yet, if there is any possibility that the object (e.g., file) can be malicious, the object may be sent to the behavioral analysis stage 340 for further investigation. Notably, for some types of objects (e.g., URLs), the static analysis stage 330 may perform a simple analysis of the object (in lieu of the filter 315) to determine whether the object is non-malicious.

In an embodiment, the filter 315 may only be applied to file objects (e.g., based on file format type). Such filtering may be employed to reduce false negatives, i.e., reduce sending benign objects to the behavioral analysis stage. For example, assume the analysis is performed by the filter 315 on an object, such as a PDF file. If there are no embedded scripts, a decision may be rendered that the file is not malicious (because it cannot execute anything). In the case of a URL object, the analysis performed by the static analysis stage 330 may include a comparison of that object with a predetermined threshold indicating a risk of maliciousness. If a score of the object exceeds the predetermined threshold, then a decision may be rendered to submit the object to the behavioral analysis stage 340 for further analysis.

The behavioral analysis stage 340 may employ a virtual machine (VM 345) configured to process (i.e., analyze) the suspect current object to arrive at a malware/non-malware classification based on observed anomalous behaviors during processing of the suspect current object (e.g., security violations captured by the VM). The observed behaviors (i.e., analysis results) for the previously analyzed object may be recorded as an entry 352 that is stored (cached) in, e.g., an object cache 350. The cached entry 352 may be indexed by an object identifier (ID) that is generated by, e.g., applying a hash function (such as MD5 or SHA-256 hash) to the object. During subsequent analysis of the current object 302, the entries 352 of the object cache 350 may be searched using the object ID of the current object and compared with object IDs of the cached entries 352 to determine whether there is match. If there is a match with a cached entry, the current object 302 may be deemed a "duplicate" object and further analysis may not be required. Rather, the recorded analysis results of the matching entry 352 may be used to either issue an alert if the current object is deemed malware (e.g., the matching entry classifies the object as malware) or to take no action (simply direct analysis workflow to other objects) if the object is classified as benign.

As noted, the malware landscape has changed to embrace the use of context-based malware triggers for the object, such as a package (e.g., including two or more files), system information (e.g., time-of-day), or different software profiles. For example, the package may be "tuned" (i.e., designed) to transform an otherwise benign primary file (within the package) into malware activated by a secondary file of the package, which may be received later than the primary file. An example of a system information malware trigger may be a "time-bomb" where an otherwise harmless file (e.g., PDF file) at a first point in time may subsequently (at a second point in time) become malicious. The file may become malicious on its own by activating malware in response to examination of a time-of-day indicator or may become malicious when combined with the secondary file of the package. Another example of the package may involve a different software profile within which an object (e.g. file) executes, such that a behavior of the object may change when executing within a different operating system. Typically, the prior analysis approach fails to consider context-based triggering of malware and, thus, is unable to detect the maliciousness of an object by simply relying on the results of previous object analysis and a comparison of object IDs between, e.g., the current object (such as a PDF file) and the previously analyzed object, because the analysis of the previous object may not apply in the context of the current object. For example, relying on invariance of similar operating system environments as to whether an object is malicious may fail to detect when an object executing on Windows XP is malicious, based on the object being previously found to be benign executing on Windows 7.

That is, even though the object, e.g., a primary file of a package (a first context), individually may be benign, when combined with another object, e.g., a secondary file of the package (a second context) designed as a trigger, the benign object (e.g., the primary file) may become malicious. Thus, whether an object is malicious (i.e., expresses malicious behavior) may depend on the context or environment in which the object operates (i.e., executes). Accordingly, the analysis performed by the malware detection system 300 may be enhanced by considering the environment or context (e.g., operating system) within which the previously analyzed and current objects operate when rendering a decision of possible duplication of the objects and, thus, applicability of analysis of the previous object to the current object. In other words, the applicability of (i.e., validity of using) analysis of the previous object to analyze the current object includes consideration of any differences between the contexts of the previous and current objects. In particular, the enhanced analysis is directed to a determination (considering differences in context) of the amount of (current) analysis required for an object that was previously analyzed and whose results of the previous analysis may be cached in an object cache 350 of the system 300. The results may be cached (stored) by object ID (e.g., an MD5 hash or SHA-256 hash) and when the current object is subsequently submitted for analysis (and its object ID matches the cached object ID) the enhanced analysis may be invoked. Notably, the object cache 350 may include context information of the object analysis associated with each object ID, as described herein.

Illustratively, the enhanced analysis may consider multiple categories of context factors, including (1) object characteristics, such as a type of content (e.g., a text file or script) accompanying each object (e.g., a PDF file) or packaging of objects (e.g., embedded or archived objects), (2) time related, such as system information (e.g., time-of-day) and time passed between analysis of the previous object and receipt of the current object, and (3) analysis applied, such as an operating system version (e.g., Windows XP and Windows 7), any combination of which can manipulate the object's behavior to evade the prior analysis approach. Other categories of context factors may include (4) object producer/consumer configuration (e.g., network IP address of a producer of the object and/or consumer of the object, type and number of attached devices, application software and/or version number) and (5) attack vectors of the object, such as web, email and file storage (e.g., network-attached storage, removable Flash drive). The context factors may also include meta-information, such as the analysis applied to the object, e.g., rules and malware indicators. Thus, the notion of "duplicate objects" is generally context-based (i.e., behavioral) and may be analyzed based on the categories/context factors, e.g., attack vector, packaging of objects, object type, software profile (e.g., operating system), object producer/consumer configuration and associated application program, and analysis applied.

Assume the current object 302, e.g., a file, is processed to calculate its object ID. If the file was previously analyzed (as manifested by a match of objects IDs 402 with a cached entry 352 of the object cache 350), the context factors may be applied to determine whether the objects are different (i.e., have changed) from the previous analysis. If the context factors have not changed, a decision of duplication may be rendered by the malware detection system 300. However if the context factors have changed (e.g., application software of an object consumer configuration has changed), the system may render a decision to perform further (behavioral) analysis by, e.g., configuring the VM with application software and/or version number that matches (or nearly matches) the application software and/or version number of the consumer. Therefore merely a match of object IDs may be insufficient to declare an object as a duplicate, according to the prior approach. For example, if the analysis environment (a context) of the object differs from that of the cached results, then behaviorally (within the context) there is not a duplicate and the current object 302 may be subjected to behavioral analysis.

In an embodiment, static analysis may involve non-behavioral analysis performed by the heuristics engine 335 within the static analysis stage 330 of the malware detection system 300. As used herein, static analysis denotes examination or testing of content of an object and observation of patterns within the content (e.g., bit patterns) to generate a score based on the content patterns. A software program (such as, e.g., open source SNORT technology) may be employed to examine chunks of bytes within an object (file) and compare those chunks with entries of a suspicious object database having chunks of objects deemed suspicious or malicious. If the chunks match, the score may be generally indicative of suspiciousness of the object. Note that the static analysis may further involve comparison of the object's content (e.g., bit patterns) with a "blacklist" of suspicious patterns before any behavioral analysis is performed. For example, a simple indicator (e.g., hash) check against the hashes of the blacklist (i.e., indicators of objects deemed suspicious) may reveal an indication of suspiciousness of the object.

As noted, the prior approach merely compared object IDs and, if there was a match, the results of the previous analysis was used; however, that approach is no longer effective for the changing malware landscape. Accordingly, the results of the previous analysis may be examined to reveal the context of those results, and the previous context may be compared with the current context of the (current) object to determine if they are different. If they are different, the current object may be subjected to behavioral analysis to further investigate maliciousness. If the results of the previous analysis indicated that the previous object is malicious, then the current object is deemed (i.e., classified) malicious (without any further context analysis). That is, once an object is classified as malicious that object is deemed malicious in any context. Accordingly, the "once-malicious-always-malicious" rule, no matter the context, improves performance of the enhanced analysis by reaching a decision (i.e., classification) on maliciousness quickly.

For example, assume that the object IDs of the current object and previously analyzed object match, and that the previously analyzed results are benign. In addition, the results of the previously analyzed object include a particular type of operating system (e.g., Windows XP) environment; however, the operating system environment for the current object is different (e.g. Windows 7 or 7/64). It is possible that the behavior of the current object 302 may be different from that of the previously analyzed object and, thus, additional behavioral analysis may be required. Even though static analysis may have examined the content of the current object (through e.g., pattern matching against entries of suspicious database/blacklist) and rendered a non-suspect decision, further analysis (e.g., behavioral analysis) may still be desirable because the context factors differ between the current and previous objects. Notably, a combination of a plurality of context factors as the object executes in an environment (e.g., a VM executing a specific operating system version for a specific object producer/consumer configuration) may be the only test for detecting the new type of malware using context-based triggering for malicious behavior.

Figure 4:
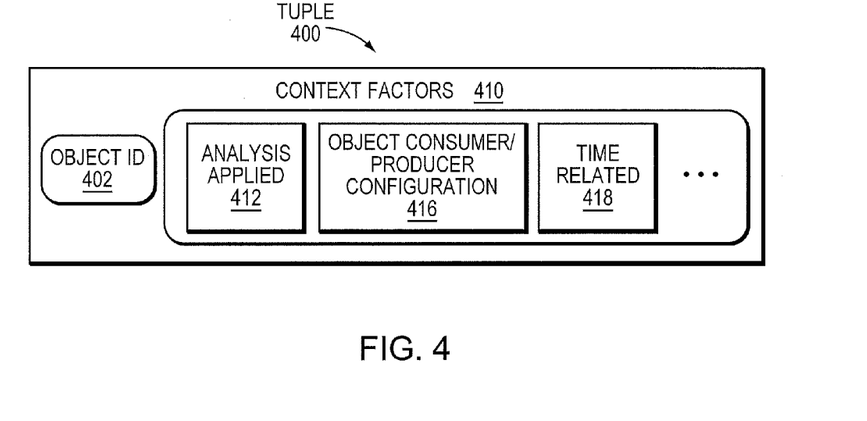
FIG. 4 is a block diagram of a tuple set that may be advantageously used with one or more embodiments described herein.
Figure 5:
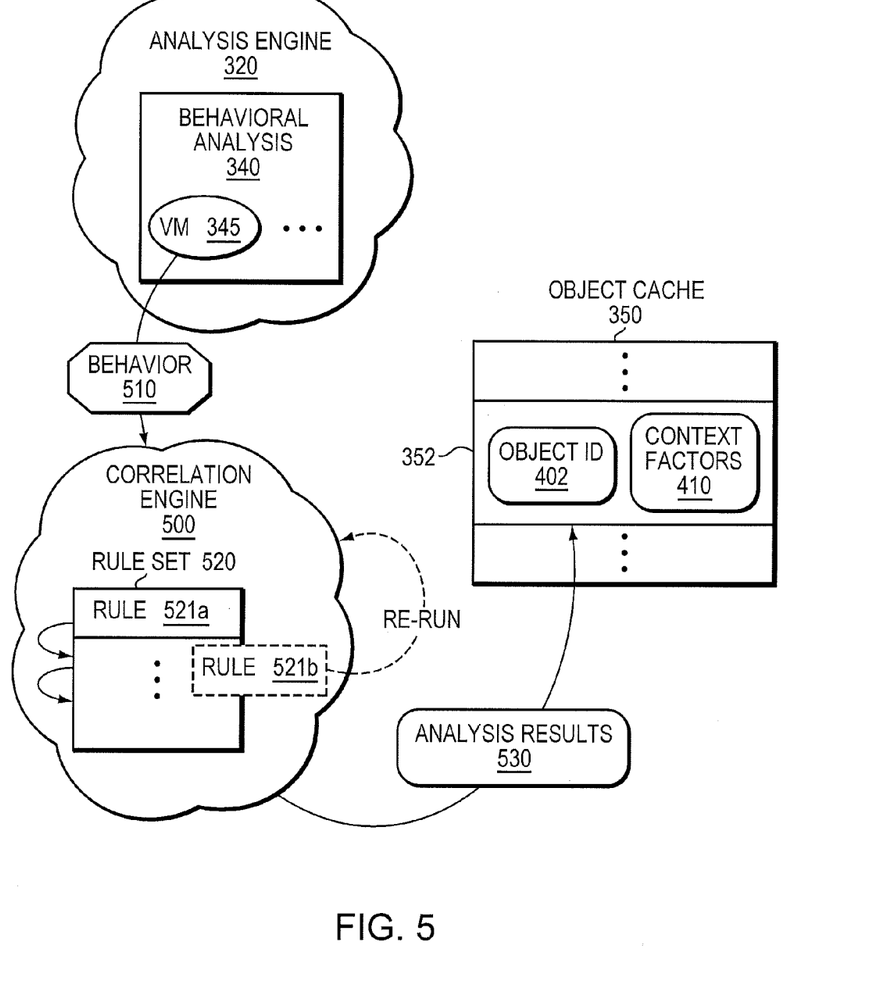
FIG. 5 is a block diagram of the correlation engine may be advantageously used with one or more embodiments described herein.

In an embodiment, the object ID may be organized as a tuple set. FIG. 4 is a block diagram of a tuple set 400 that includes the object ID 402 and zero or more context categories represented as context factors 410. Illustratively, the context factors may include: (i) the software profile of the VM 345 (e.g., operating system); (ii) application program of object producer/consumer; (iii) a type (e.g., executable, PDF, ZIP, text file) containing or constituting the object; (iv) proximity in time (e.g., from caching of the previously analyzed object to analysis of the current object) having a predefined window of time; and (v) a version of the analysis (e.g., rules, indicator databases) applied in determining maliciousness of the object. In the VM 345, various activities of the object (e.g., file) may be recorded, such as opening of the file, reading of the file, writing of data to an operating system registry, and then those activities may be analyzed, e.g., by the correlation engine 500, using correlation rules (and indicators) indicating maliciousness to render a decision of malicious (or not). When the correlation rules are updated (i.e., a version change), a decision may be rendered, e.g., automatically or by an administrator, whether to include a version of the rules as part of the object context so as to analyze the object in view of the changed (i.e., updated) version of the rules such that a previously determined benign object may now be rendered malicious (or vice-versa).

In an embodiment, the tuple set 400 may be configured by an administrator. For instance, in some cases, object ID matching may be sufficient. If a different type of attack (e.g., via a different attack vector or different anomalous behavior) is observed, additional context factors 410 may be employed in the behavioral analysis stage 340. For example, a time-related category/context factor 418, such as a time-of-day or time lapse/proximity between objects, may denote a time for instantiating the VM 345 and/or beginning of behavioral analysis on a particular suspect object. The time-related factor may be helpful information in detecting whether the object activates malicious behavior at different times. That is, a plurality of behavioral analyses with differing execution times may be helpful to determine observed behaviors of the object at different times. This is particularly useful in detecting malware triggered by a time-of-day condition, such as a specific date or hour of the day.

Therefore, upon submission of the current object 302 to the malware detection system 300, a decision may be rendered (e.g., by the administrator) as to the content of the tuple set 400. For example, the administrator may decide to configure the tuple set 400 with only the object ID 402 of the object 302 such that only the initially received object is subjected to static analysis and/or behavioral analysis of the system 300 (later received duplicate objects rely on analysis of the initially received object). If more precision of duplication (i.e., considering context) is desired, the administrator may expand the tuple set 400 to include other categories/context factors 410 such as an analysis applied 412, e.g., the operating system, and object producer/consumer configuration 416, e.g., associated application program. For instance, malware may target a particular type or version of operating system (e.g., Windows 7, Windows 7/64). If the different operating system type (e.g., Windows XP) or version (e.g., Windows 7/64) is used with the current object 302 and the results of a previously analyzed object match that different operating system type (or version), then a match of object IDs may render the current object a duplicate. Yet if a comparison of the previously analyzed results do not indicate a match in the types (or versions) of operating systems (Windows 7 vs. Windows XP), additional behavioral analysis may be required (resulting in additional behavioral analysis using the VM 345).

Even though the object ID 402 of the current object 302 may match that of a cached entry 352 of the object cache 350, if one or more context factors 410 differ (e.g. a different operating system, an out-of-window timestamp, different file types of the package) then the current object 302 may be subjected to further analysis. In sum, because of the changing malware landscape, a content (static) analysis of the object is less effective and contextual factor (behavioral) analysis may be more effective.

In an embodiment, the correlation engine 500 executes rules (which may be frequently updated) when performing correlation analysis of an object. FIG. 5 is a block diagram of the correlation engine 500, which may be embodied as a module of the malware detection system 300. Illustratively, the correlation engine 500 may be configured to receive a plurality of inputs directed to (1) behavioral activity 510 of the object, as provided by the analysis engine 320, and (2) a correlation rule set 520 (having one or more rules 521.) The correlation analysis performed by the correlation engine 500 may involve, e.g., applying the correlation rule set 520 against the behavior activity 510. Accordingly, the correlation engine 500 may contain computer executable instructions executed by the CPU to perform operations that apply, e.g., compare, examine and/or analyze, the behavioral activity 510 with the rule set 520. An output of the correlation engine may include analysis results 530 pertaining to a determination of malicious (or not), as well as details of the correlation analysis.

As noted, various activities of the object (file) may be recorded by the VM 345 of the analysis engine 320 and those activities may be analyzed by correlation engine 500 using, e.g., updates to rules of the correlation rule set 520 that indicate maliciousness to render a decision of malicious (or not). An example of an updated correlation rule defining maliciousness is as follows. Assume that execution of an object, such as a file, modifies an operating system registry key. Based on the results of a previous analysis, modification of the registry key may not be deemed malicious. However, an update of the rule may specify that modification of the registry key is deemed malicious. Accordingly, an update of the correlation rule may necessitate re-analysis of the object (i.e., the current object) by the correlation engine 500. Note that changing or updating of the correlation rule may be based on e.g., experiential knowledge.

When the rules are updated, a decision may be rendered to analyze the object in view of the updated rules. That is, the tuple 400 may be configured to include a version number of the correlation rules as part of the context for the object. In addition, the decision to re-analyze the object may be rendered, e.g., automatically or by the administrator, based on the type of object. For example, the administrator may decide that rules for a type of object (e.g., executable and/or PDF file) may be re-analyzed (re-run) for such objects, i.e., previous analyses for objects already in the object cache 350 may be re-run when the correlation rules change, such as a change in the version number of the correlation rules in the tuple (e.g., rule 521a changed to rule 521b). Notably, there may be no need to reconfigure the VM 345 of the behavioral analysis stage 340 and re-execute the object in the VM; rather the previous results of the VM analysis (e.g., monitored behavior) may be re-run through the correlation engine 500 by applying the changed (i.e., different) rules. In other words, all behavior evinced by a sample being analyzed during behavioral analysis may be logged (recorded) and that recorded activity may be re-passed (re-run) through the correlation engine 500 with the different, updated correlation rule set. Similarly, in the case of static analysis, an update (e.g., correcting a bug) to the heuristics engine 335 may lead to a decision to re-analyze an object. As a result, the previous static analysis may no longer be valid and the cached results may need to be re-run throughout the corrected (updated) heuristics engine 335.

Figure 6:
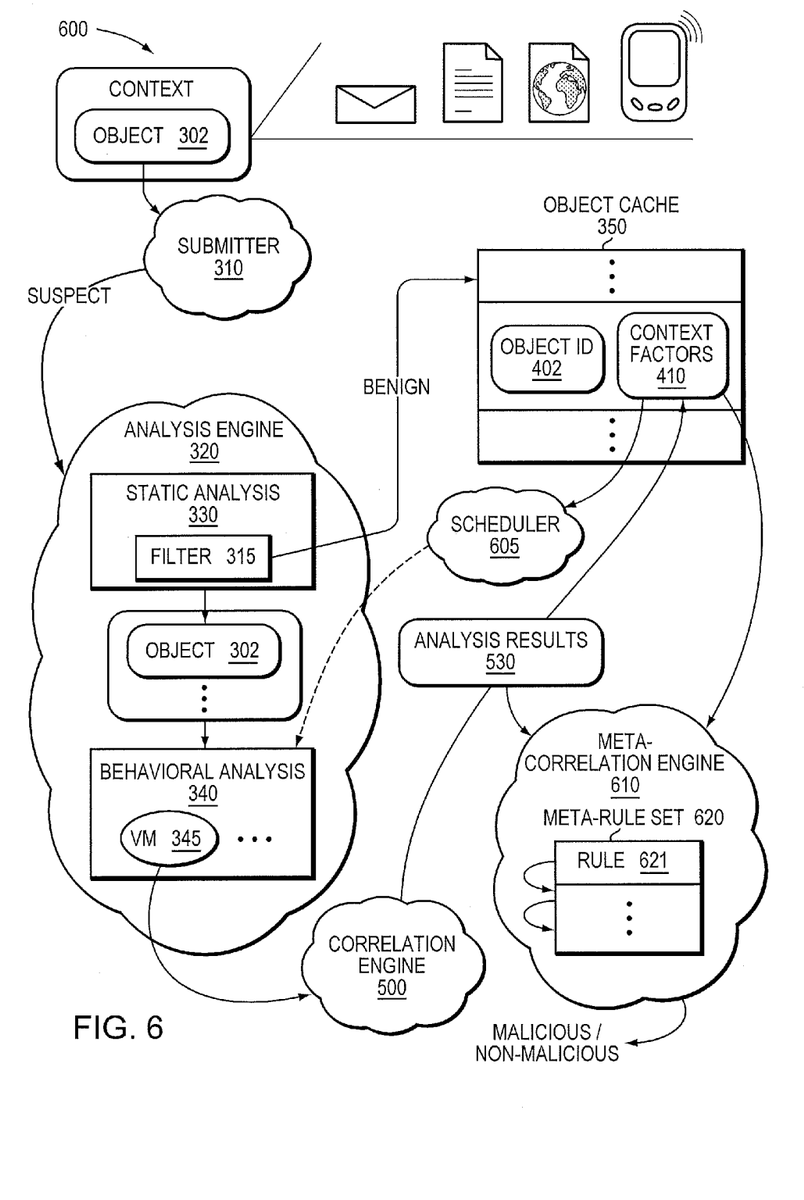
FIG. 6 is a diagram of a workflow of the enhanced analysis provided by the malware detection system.

FIG. 6 is a diagram of a workflow 600 of the enhanced analysis provided by the malware detection system 300. The workflow 600 starts with an attack vector (e.g., file storage, an email or network content from one of a plurality of sources or ingresses) provided to the submitter 310, which may extract the current object 302 from the payload of the attack vector. The submitter 310 may then provide the object to the analysis engine 320, which includes static analysis stage 330 and behavioral analysis stage 340. After processing by the analysis engine 340, the object may be provided to the correlation engine 500, which renders results of the enhanced analysis of the object, including a decision of malicious (or not). The results may thereafter be re-run by the correlation engine 500 for an updated set of rules, which may impact the resulting decision. Notably, scheduling of the behavioral analysis stage 340 by, e.g., scheduler 605 of the system may consider a length of a queue of suspect objects 302 awaiting behavioral analysis, traffic conditions, and any possible "threat level" posed by the object. Based on these considerations, the scheduler may drop certain suspect objects from further analysis. Alternatively, or in addition, the system may use the object ID 402 and context factors 410 to prioritize the object for behavioral analysis. For example, if the correlation with a previously analyzed object (determined to be malicious) is substantially high (though not a match), the object may receive a high priority for behavioral analysis.

While there have been shown and described illustrative embodiments of a malware detection system configured to enhance analysis of an object when determining whether results for a previously analyzed object may be applied to the object, it is to be understood that various other adaptations and modifications may be made within the spirit and scope of the embodiments herein. For example, embodiments have been shown and described herein with relation to context factors, such as software profile, proximity in time and rules of a rule set. However, the embodiments in their broader sense are not so limited, and may, in fact, also allow for additional context factors. For example, another context factor may be behavioral analysis duration, which regulates a period of time at which an object is analyzed/run by, e.g., learning from the previously analyzed results of the object. Another context factor may be prioritization of behavioral analysis based on close similarity of an object to a previously analyzed object which was deemed malicious. A suspiciousness determination of a previously analyzed object may be used to alter the context factors pertaining to behavioral analysis, including configuration (e.g., operating system) and duration of testing/analysis.

Assume an object has been identified as an exact duplicate of a previously analyzed object or a highly suspicious object (not an exact duplicate) based on results of the previous analysis. Accordingly, those results may be considered "history" (based on the previous object analysis). The results of the current object analysis (e.g., the static analysis and behavioral analysis) and history may then be provided as inputs to a second (i.e., meta) correlation engine 610, which may contain computer executable instructions executed by the CPU to perform correlation analysis by, e.g., applying meta-correlation rules of a meta-correlation rule set 620 with the object analysis results and history to generate a score indicative of a decision of malicious (or not malicious). Note that the score may be a quantitative score (e.g., a numerical value) or qualitative score (e.g., associated risk, such as high, medium or low risk).

For example, if the generated score exceeds a threshold, the decision may be that the current object is malicious. Illustratively, the meta-correlation analysis includes consideration of the meta-correlation rules with respect to all the inputs (e.g., context factors and history) when generating the score, e.g., if a particular type/characteristic of history is observed, then the meta-correlation analysis may increase or decrease the score generated on the basis of the static and behavioral analysis. Notably, whereas the first correlation engine 500 may apply rules to the static and behavioral analysis inputs, the second (i.e., meta) correlation engine 610 may further apply rules to the history input. That is, the correlation (i.e., first) rule set is "historyless" (i.e., Markovian) and the meta-correlation (i.e., second correlation) rule set includes analysis history (i.e., non-Markovian).

Advantageously, the enhanced analysis provided by the malware detection system described herein is bounded by the notion of the current object under analysis being a duplicate (or near duplicate) of a previously analyzed object and how that duplicateness may be used in the analysis of the current object.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving a first object via a network, the first object associated with a first context and a first object identifier (ID);
monitoring behavior of the first object using the first context in a first virtual machine executing on a processor of a first node of the network;
classifying the first object as benign in response to the monitored behavior;
receiving a second object via the network, the second object associated with a second context and a second object ID matching the first object ID;
determining whether the first context is different from the second context, wherein the difference is determined by comparing corresponding context factors including a time-related factor associated with the first object and the second object and a mode of ingress to the network associated with the first object and the second object;
in response to determining that the first context is not different from the second context, rendering a decision that the second object is a duplicate of the first object; and
in response to the decision, determining one or more of
(i) whether to monitor behavior of the second object and
(ii) a priority for scheduling of monitoring behavior of the second object in a second virtual machine.

2. The method of claim 1 further comprising:
in response to determining that the first context is different from the second context, prioritizing monitoring behavior of the second object by extending monitoring of behavior of the second object in the second virtual machine.

3. The method of claim 2 wherein the first context includes a first rule set used in the behavior monitoring of the first object, and wherein the second context includes a second rule set different from the first rule set.

4. The method of claim 2 wherein determining whether the first context is different from the second context further comprises:
computing a time difference from a monitoring start time for the monitoring of the behavior of the first object to an analysis start time of the second object, wherein the time-related factor of the first object represents the monitored start time; and
comparing the time difference to a time window, such that when the time difference is outside the time window, the first context is different from the second context.

5. The method of claim 2 wherein classifying the first object as benign further comprises:
correlating the monitored behavior of the first object against a first set of rules; and
recording an association of the first object ID with not malicious.

6. The method of claim 5 wherein classifying the first object as benign further comprises:
correlating a history of monitored behavior for the first object against a second set of rules.

7. The method of claim 5 further comprising:
determining whether the second object is malicious by correlating the monitored behavior of the second object against the first set of rules; and
associating the second object ID with maliciousness.

8. The method of claim 7 further comprising:
receiving a third object associated with a third context different from the first context;
generating a third object ID from the third object, the third object ID identical to the first object ID; and
issuing an alert indicating that a malicious object is received.

9. The method of claim 5 further comprising:
correlating the monitored behavior of the first object against a second set of rules, wherein the second set of rules is different from the first set of rules, and wherein the first context includes the first set of rules and the second context includes the second set of rules.

10. A method comprising:
receiving a first object associated with a context;
generating a first object identifier (ID) from the first object;
associating the context with the first object ID;
determining whether the first object includes an executable;
in response to determining that the first object includes an executable, monitoring behavior of the first object using the context in a first virtual machine executing on a processor of a node, the context including a software profile of the first virtual machine and time-related information;
associating the context with a second object ID matching the first object ID;
receiving a second object associated with the context, wherein the second object ID is generated from the second object;
determining a time proximity between arrival of the first object and the second object using the context; and
in response to determining that the time proximity is inside a selected time window, filtering the second object to avoid behavior monitoring of the second object in a second virtual machine.

11. A system comprising:
a network port connected to a network;
a memory configured to store a first object, a second object, a first operating system, a first virtual machine and a second virtual machine;
one or more processing elements coupled to the network port and adapted to execute the virtual machines and the first operating system, the first operating system configured to:
receive the first object via the network, the first object associated with a first context and a first object identifier (ID);
monitor behavior of the first object using the first context in the first virtual machine;
classify the first object as benign in response to the monitored behavior;
receive the second object via the network, the second object associated with a second context and a second object ID matching the first object ID;
determine whether the first context is different from the second context, wherein the difference is determined by comparing corresponding context factors including a time-related factor associated with the first object and the second object and a mode of ingress to the network associated with each object;
in response to determining that the first context is not different from the second context, render a decision that the second object is a duplicate of the first object; and in response to the decision, determining one or more of
(i) whether to monitor behavior of the second object and
(ii) a priority for scheduling of monitoring behavior of the second object in the second virtual machine.

12. The system of claim 11 wherein the first operating system is further configured to:
in response to determining that the first context is different from the second context, prioritize behavior analysis of the second object by extending monitoring of behavior of the second object in the second virtual machine.

13. The system of claim 12 wherein the first context includes a first configuration of the first virtual machine, and wherein the second context includes a second configuration of the second virtual machine different from the first configuration.

14. The system of claim 12 wherein the first operating system is further configured to, in determining whether the first context is different from the second context:
compute a time difference from a monitoring start time for the monitoring of the behavior of the first object to an analysis start time of the second object, wherein the time-related factor of first object represents the monitored start time, and
compare the time difference to a time window, such that when the time difference is outside the time window, the first context is different from the second context.

15. The system of claim 12 wherein the first operating system configured to classify the first object as benign, is further configured to:
correlate the monitored behavior of the first object against a first set of rules; and
record an association of the first object ID with not malicious.

16. The system of claim 15 wherein the first operating system configured to classify the first object as benign, is further configured to correlate a history of monitored behavior for the first object against a second set of rules.

17. The system of claim 15 wherein the first operating system is further configured to:
determine whether the second object is malicious by correlating the monitored behavior of the second object against the first set of rules; and
associate the second object ID with maliciousness.

18. The system of claim 15 wherein the first operating system is further configured to:
receive a third object via the network, the third object different from the first object, the third object associated with the first context, the third object designed to trigger malicious behavior of the first object;
determine whether the third object is malicious by correlating monitored behavior of the third object against the first set of rules; and
in response to determining that the third object is malicious by triggering malicious behavior of the first object, associate the first object ID with maliciousness.

19. The system of claim 15 wherein the first operating system is further configured to:
correlate the monitored behavior of the first object against a second set of rules, wherein the second set of rules is different from the first set of rules, and wherein the first context includes the first set of rules and the second context includes the second set of rules.

20. The system of claim 15 wherein the first operating system is further configured to:
perform a static analysis on the first object using heuristics to determine a score indicating a risk of maliciousness.

21. The method of claim 1 wherein the first object is hashed to generate the first object identifier.

22. The method of claim 1 wherein the first object is received at a second node of the network different from the first node.

23. The method of claim 2 wherein the first context includes an operating system having a first version, and wherein the second context includes the operating system having a second version different from the first version indicating that the first context is different from the second context.

24. The method of claim 6 wherein the second set of rules is an updated version of the first set of rules.

25. The system of claim 11 wherein the first object is hashed to generate the first object ID and the second object is hashed to generate the second object ID.

26. The system of claim 12 wherein the first context includes a second operating system having a first version, and wherein the second context includes the second operating system having a second version different from the first version indicating that the first context is different from the second context.

27. The system of claim 16 wherein the second set of rules is an updated version of the first set of rules.

28. The method of claim 1 wherein the mode of ingress to the network is selected from one of email, web, file storage, and mobile network.

29. The method of claim 1 wherein the time-related factor associated with each object represents one of a time-of-day, an arrival time of a respective object at the first node, and a monitoring start time of the respective object.

30. The system of claim 11 wherein the mode of ingress to the network is selected from one of email, web, file storage, and mobile network.

31. The system of claim 11 wherein the time-related factor associated with each object represents one of a time-of-day, an arrival time of the respective object via the network, and a monitoring start time of the respective object.

32. The method of claim 1 wherein the rendering the decision further includes correlating the first object to the second object.

33. The system of claim 11 wherein the rendering the decision further includes correlating the first object to the second object.

34. The method of claim 1 further comprising, for each of a plurality of previously monitored objects having a respective previous context:
determining whether the respective previous context is different from the second context, wherein the difference is determined by comparing corresponding context factors including the time-related factor associated with the first and respective previously monitored objects and the mode of ingress to the network associated with the respective previously monitored object and the second object;
in response to determining that the first context is not different from the respective previous context, rendering another decision that the second object is a duplicate of the respective previously monitored object; and
in response to the decision, determining one or more of
(i) whether to monitor behavior of the second object and
(ii) another priority for scheduling of monitoring behavior of the second object in the second virtual machine.

* * * * *